(12) United States Patent
Blacoe

(10) Patent No.: US 11,701,579 B2
(45) Date of Patent: Jul. 18, 2023

(54) MODULAR CONTROLLER

(71) Applicant: ByoWave, Ltd., Galway (IE)

(72) Inventor: Brandon Blacoe, Galway (IE)

(73) Assignee: ByoWave, Ltd., Galway (IE)

( * ) Notice: Subject to any disclaimer, the term of this patent is extended or adjusted under 35 U.S.C. 154(b) by 0 days.

(21) Appl. No.: 17/749,990

(22) Filed: May 20, 2022

(65) Prior Publication Data
US 2023/0112293 A1    Apr. 13, 2023

(30) Foreign Application Priority Data
Oct. 11, 2021    (EP) ..................................... 21202015

(51) Int. Cl.
*A63F 13/24*    (2014.01)

(52) U.S. Cl.
CPC ................. *A63F 13/24* (2014.09)

(58) Field of Classification Search
CPC ............................... A63F 13/24; A63H 33/04
See application file for complete search history.

(56) References Cited

U.S. PATENT DOCUMENTS

| | | | |
|---|---|---|---|
| 10,886,051 B2 * | 1/2021 | Osipov | A63H 33/042 |
| 11,247,141 B2 * | 2/2022 | Tusacciu | A63H 33/046 |
| 2011/0105231 A1 * | 5/2011 | Ambinder | A63F 13/24 463/38 |
| 2013/0109267 A1 * | 5/2013 | Schweikardt | A63H 33/042 446/85 |
| 2021/0308564 A1 * | 10/2021 | Black | A63F 13/23 |

* cited by examiner

*Primary Examiner* — Peter J Iannuzzi

(57) ABSTRACT

A modular controller is provided for communication with an electronic device comprising: a first multi-faced module comprising at least one connector for releasable attachment to one or more additional modules; the at least one connector providing physical integration and electrical connectivity between the first module and the one or more additional modules.

13 Claims, 18 Drawing Sheets

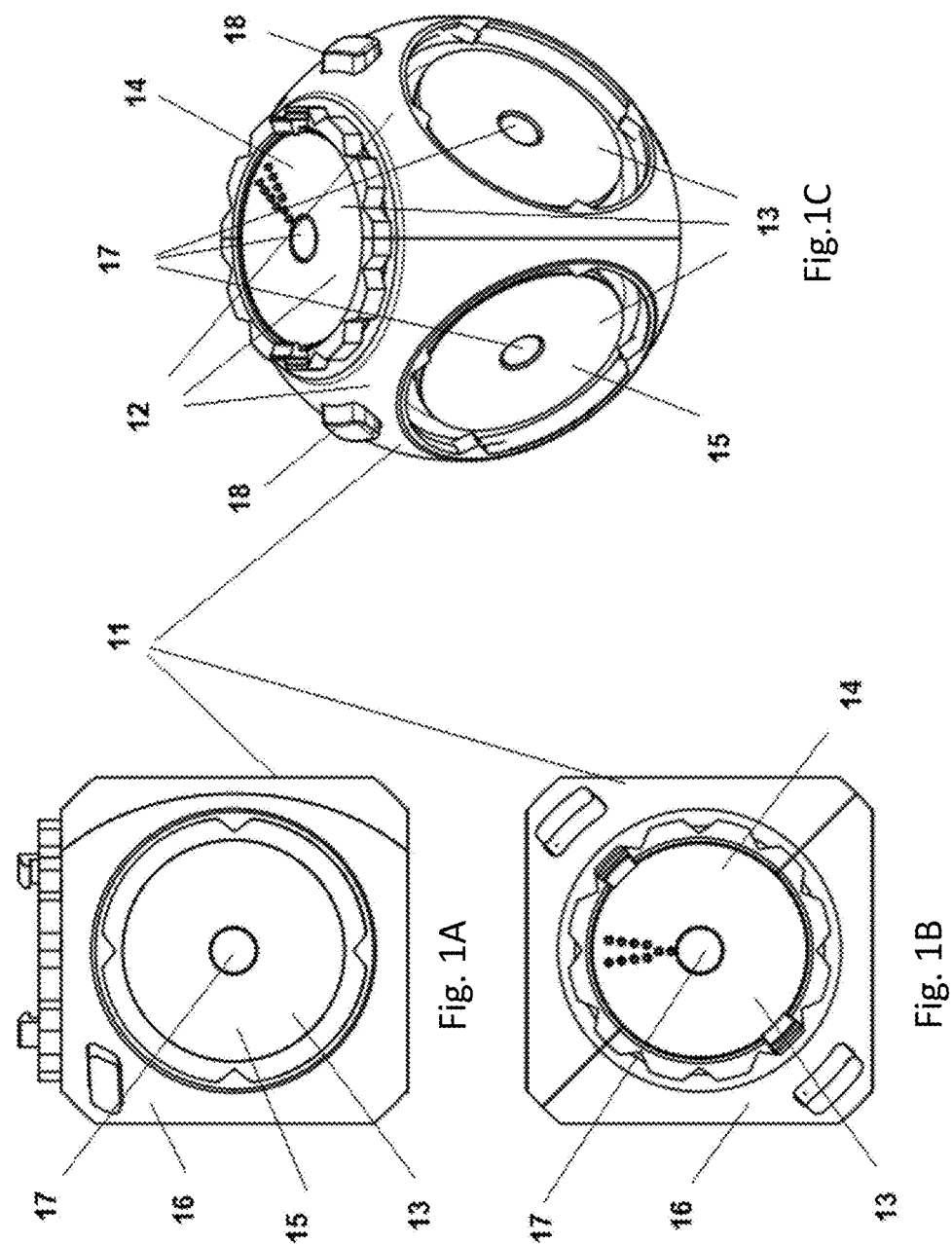

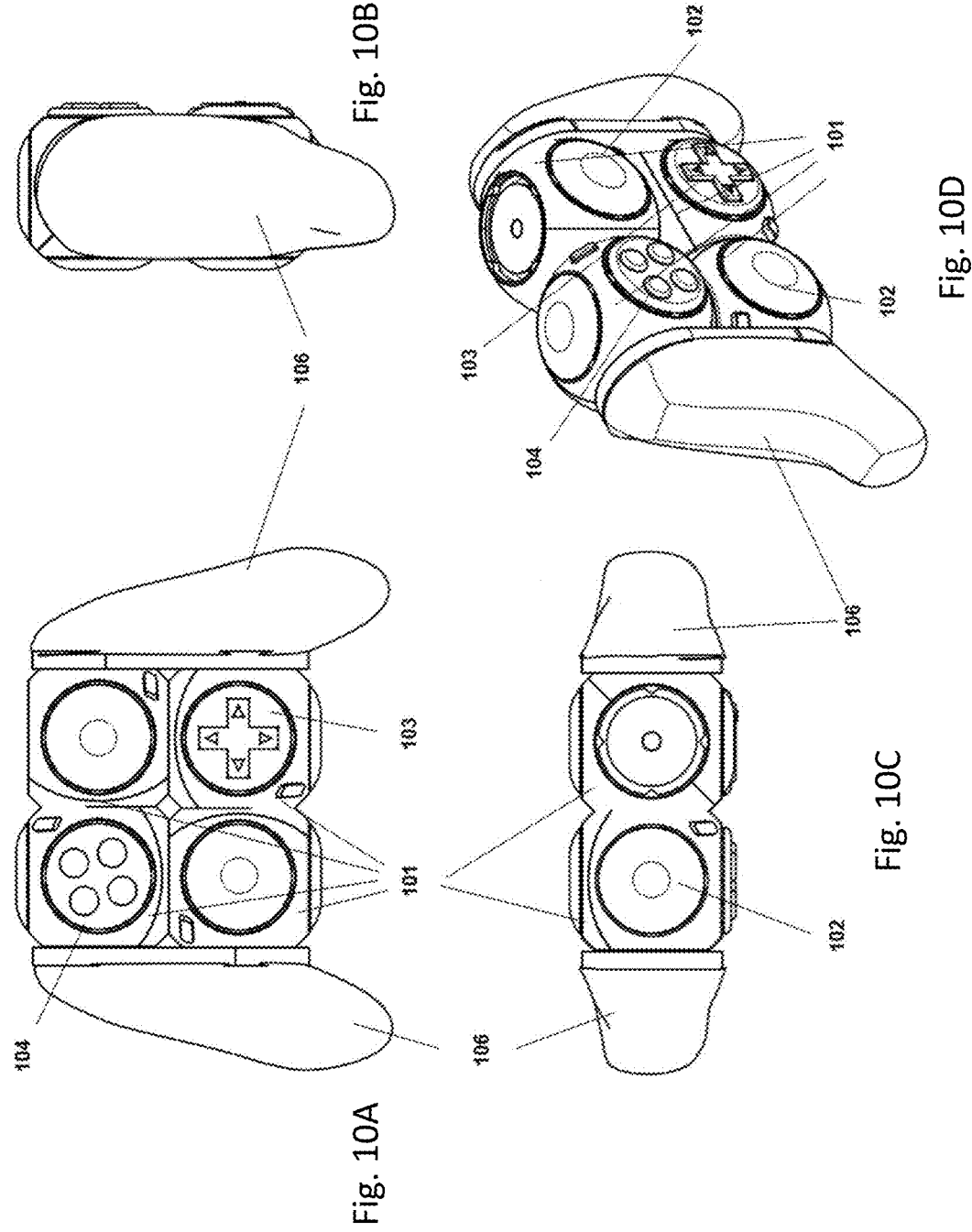

MODULAR CONTROLLER

TECHNICAL FIELD

The present invention relates to a controller for an electronic device such as a games system. In particular, it relates to a modular controller for an electronic device.

BACKGROUND

Games systems and PC gaming have been consistently popular for many years. There are several generic gaming controllers available on the market today. These are predominantly wireless, fixed, two-handed controllers which have fixed button positions. Examples of these include Microsoft Xbox® Wireless Controller, Sony PlayStation DualSense®, Microsoft Xbox Elite Wireless Controller Series Two®. Xbox Adaptive Controller® was released as a gamepad to which peripherals can be attached at input pins to allow for customisation.

However, these generic fixed two-handed controllers present major disadvantages to certain users, for example, users with disabilities. The customisation of the placements of buttons or the size/shape of the controller does not work well for all users. Although the Xbox Adaptive Controller overcomes some of these challenges, it takes up a very large surface area, is sold separately to external buttons and the gamepad itself isn't modular or customisable. Furthermore, this controller is not handheld and requires the use of multiple elements to be connected by wires to a central control box, the box itself being quite large and bulky.

The Applicant's research has found that 180 million disabled gamers do not get to engage in video games as much as they would like, or sometimes at all, due to the lack of accessible controllers. In a world that is moving toward virtual reality more and more every day, it is evident that this is only going to become more problematic.

As the population growing up in the digital generation is getting older, more and more people will need accessible input devices and controllers due to age related impairments such as arthritis. In addition to the increased demand from disabled gamers, professional gaming is another area that would benefit from greater levels of customisation of controllers. The pro gaming space is getting increasingly competitive, with increasing amounts of lucrative prizes at stake. Fine margins define success in this industry, such that the current "one size fits all" approach to controllers is not satisfactory. The controller is the most critical piece of equipment for pro gamers; it is the interface between human and computer. The ability to improve reaction speed by tiny amounts through the customization and personalization of a pro-gamer's controller could potentially have significant implications.

A controller providing a modular and customisable shape for a device and for the placement of the peripheral modules would be an improvement over the state of the art and would allow all users to access games and have the experiences they want.

SUMMARY

The present disclosure provides a modular controller for communication with an electronic device comprising a first multi-faced module comprising at least one connector for releasable attachment to one or more additional modules; the at least one connector providing physical integration and electrical connectivity between the first module and the one or more additional modules.

This advantageous as it provides that a controller may be built to the desired specifications of a user from one or more modules. The modules are releasably attachable such that they may be easily connected and disconnected by the user as required. The modules are configured such that the at least one connector provides for physical integration between a first module and one or more additional modules. In this manner, the integrated modules have the appearance of and can function as a single device. The connector further provides for electrical connectivity between the first module and the one or more additional modules. This ensures that where, for example, the first module is powered, the power may be transferred to any further connected additional modules.

The first multi-faced module and the further multi-faced module may be substantially cube shaped. The substantially cube shaped modules provide for ease of attachment to additional modules along and about the outer faces of the cube shape. The substantially cube shaped modules may have a plurality of planes of symmetry, for example two, three, four, five, six, seven, eight, nine or more planes of symmetry.

Having a plurality of planes of symmetry provides for a more regularly-shaped module that facilitates higher permutations of multi-module configurations, thereby increasing the total number of overall controller shapes that can be constructed. It is envisaged that other module shapes with a plurality of planes of symmetry may be similarly suitable. It will be appreciated that assessment of planes of symmetry may be performed with respect to the overall module shape, and superficial asymmetries (such as for instance those related to buttons or other mechanisms to facilitate detachment or release of modules) may be disregarded.

The first substantially cube-shaped module and the further substantially cube-shaped modules may comprise one or more rounded corners. This is advantageous as it provides an ergonomic shape which is comfortable to hold and manipulate for the user.

The one or more additional modules may comprise a further multi-faced module or a peripheral user input element. This is advantageous as it provides a high degree of customisability to a user in that they are provided with the option of multiple configurations of modules and peripheral user input elements. The peripheral user input element may also be referred to as an input device or peripheral user input device, and may be considered one type of peripheral device. The one or more additional modules may further comprise a further type of peripheral device that may not provide for an input to the controller per se, but instead aid with customising the shape, appearance and usability of the controller, as will be described in greater detail below.

The peripheral user input device may comprise one or more of a button, joystick, trigger, mini joystick, directional pad. This provides the user with multiple input options when the controller is in communication with an electronic device, for example a gaming console. One or more of each of the input devices may be connected to a module.

The multi-faced module comprises six face surfaces and the at least one connector is configured on a face surface of the module. Configuring the connector on a face surface of the module provide for ease of connection and disconnection from additional modules and input devices. For example, a face of a first module may be connected directly to a face of a second module by bringing the face surfaces into contact with each other. As such, the need for additional cabling or adapters to connect modules is obviated.

The modular controller may comprise a further connector configured on at least one further face surface of the module. This provides for the connection of multiple modules and peripheral devices.

The modular controller may comprise at least one male type connector and at least one female type connector. Different connector types may be used for the connection of different elements. For example, a male type connector may be provided for connection of a module to an additional module, while a female type connector may be provided for connection of a module to a peripheral device.

The male type connector of the modular controller may comprise a plurality of pogo pins for providing electrical connectivity. Pogo pins are spring loaded, thus they provide for a reliable mechanically biased electrical connection between the pins of a first module and corresponding receiving holes or recesses on a connected second module. Again, this obviates the need for cabling to transfer power from a first module to a connected module.

The plurality of pogo pins are configured in a matrix formation. This provides a robust pin configuration for transfer of electrical power between modules, when compared to for example, single pin or linear pin configurations.

The female type connector may comprise a plurality of alignment teeth. This facilitates the connection between modules and ensures that a robust and stable connection is in place. This further provides a visual aid for the connection of modules.

The male type connector may comprise a gear for engagement with the plurality of alignment teeth of the female to male connector. This ensures a mechanically strong connection between two modules which further acts to prevent detachment of connected modules. This is advantageous as, for example, game controllers may be knocked or hit vigorously during normal use.

The modular controller may comprise a single male type connector on one of the six face surfaces and five female type connectors on the remaining five face surfaces. Such a configuration provides a high degree of customisability to a user providing multiple options for connection of modules to modules, and modules to peripheral devices. For example, as a user builds up a modular controller and adds one new module, as long as that new module has at least one male connector, the possibilities for further customization are maximized.

The connector of the modular controller may comprise a magnetic element. This provides for a straightforward, yet strong, connection between modules. It further obviates the need for more complex plug and receiver type connectors. In addition, it facilitates maintaining electrical connection between modules.

The connector may be a friction-fit connector. In addition to a magnetic connection, the connector may further provide a degree of friction fitting. This provides and additional level of robustness to the connection such that it can resist strikes or blows without becoming disconnected.

The first module and at least one additional module may be rotatable relative to each other about the connector. This provides multiple degrees of freedom to a user to customise the modular controller to their own design. Accordingly, not only can modules be connected to additional modules and peripherals, but the modules may be rotatable about the connector such that the relative positions of adjoining modules may be altered. For example, two modules may be aligned such that a second surface of both the first module and the second may be in a side by side configuration. The first module may then be rotated such that a third face surface of the first module is now in a side by side configuration with the second surface of the second module. Furthermore, the first module may undergo a partial rotation such that the first module presents both the first surface and the third surface at an angle in side by side configuration with the second surface of the second module.

The first module and at least one additional module may be rotatable about the connectors into a plurality of indexed configurations. The indexed configurations provide a plurality of fixed positions whereby a module being rotated about a connector with an additional module may latch or "click" into place. Providing indexed configurations in this manner ensures that strong mechanical and electrical connectivity is maintained between connected modules.

The at least one connector of the modular controller may comprise a release mechanism. The modules are configured to be releasably attachable so that, while a connection remains strong while it is in place, it must also be easily detachable by a user for reconfiguration as desired. As such, the release mechanism provides for a reliable and rapid manner to detach a module from a connected module. The release mechanism may comprise a pinch release mechanism or a biased release mechanism. The biased release mechanism may comprise a spring loaded latch mechanism. This provides that modules may be reliably "popped" apart upon being disconnected.

The connector of the modular controller may be sealable. The connector may be sealable by one of a plug element or a handle element. This provides that connectors may be protected when not in use. Furthermore, when a connector is sealed by a handle element, this provides the dual function of protecting the connector area while also serving to enhance the usability and comfort of the overall device.

The first multi-faced module may further comprise internal logic to map the position and orientation of the one or more additional modules. This is advantageous as it provides for correctly routing of signal through the controller any from the controller to the electronic device under command of the controller.

The first multi-faced module further comprises an internal power source. This is advantageous as it provides that the modular device may remain untethered from the power source of the device under command and also provides for additional freedom of movement for the user.

A further aspect of the disclosure provides a handheld modular controller wherein the controller may comprise at least one module including an outer shell element, an internal electronics element and a plurality of connecting faces for connecting with a corresponding connecting face of other modules or of input devices, wherein each connecting face of the at least one module comprises means for physical and electrical coupling of the face of said module with the corresponding connecting face of another module such that said module and said another module or input device are connectable to one another about a common axis and in a plurality of rotational orientations relative to one another about said common axis. It will be appreciated that the common axis may be a common central axis. If will further be appreciated that the means for physical and electrical coupling may comprise a connection mechanism for both physical and electrical coupling and/or individual connection mechanisms dedicated respectively to physical coupling and to electrical coupling.

This provides a handheld device that presents a high degree of configurability to the user. Connecting modules or input devices at connecting faces allows a number of individual modules or devices to be connected together in tandem to provide a single physically integrated handheld device. Furthermore, the modules and devices are maneuverable into a plurality of rotational orientations relative to one another about a common axis. As such, two modules may configured in a first orientation and subsequently rotated by a user into a second orientation different to the first. Thus, not only is the controller customizable by the connection of modules and devices, it is further customizable by the rotation of connected devices.

Each connecting face of the handheld modular controller may further comprise means for magnetically coupling the face of said module with the corresponding connecting face of another module. The magnetic coupling provides a strong reliable connection between modules and input devices and further aids the electrical connectivity between connected modules and devices.

The plurality of rotational orientations of the handheld modular controller are indexed such that that a module and another module are rotatable relative to each other to move one of the said module and said another module from a first indexed orientation to a second indexed orientation. This provides a simple physical means of moving a module from one orientation to another orientation. A user may turn or twist a module relative to another module. Upon rotation, the module moves from a first indexed position and is turned by the user until it is set or clicked into a desired second orientation. The orientation may be changed again by the application of further rotation to one of the modules.

The internal electronics element of the handheld modular game controller may be configured to detect the relative rotational orientations of said module and said another module. This provides that signals from the inputs of connected modules may be properly translated into directional movement instructions for the device under the command of the controller.

A further aspect of the disclosure provides a handheld modular game controller comprising a first module and a second module wherein a connecting face on each of the first and second modules provides a physical and electrical connection between the first and second module such that the first and second modules are rotatable about the connection into a plurality of orientations. Each module may include an outer shell element, an internal electronics element and a plurality of connecting faces for connecting with a corresponding connecting face of other modules or of input devices.

An additional aspect of the disclosure provides a handheld modular controller comprising: at least one module including an outer shell element, an internal electronics element and a plurality of connecting faces for connecting with a corresponding connecting face of other modules or of input devices, wherein each connecting face of the at least one module comprises at least one connection mechanism for physical and electrical coupling of the face of said module with the corresponding connecting face of another module or input device; such that said module and said another module or input device are connectable to one another about a common central axis and in a plurality of rotational orientations relative to one another about said common central axis.

At least one connection mechanism of the modular controller may be configured for magnetically coupling the face of said module with the corresponding connecting face of another module or input device.

The plurality of rotational orientations of the controller may be indexed such that said module and said another module or input device are rotatable relative to each other to move one of the said module and said another module or input device from a first indexed orientation to a second indexed orientation.

The internal electronics element of the controller may be configured to detect the relative rotational orientations of said module and said another module or input device Each connecting face of the controller may comprise a first connection mechanism configured for physical coupling and a second connection mechanism configured for electrical coupling.

Each connecting face of the modular controller may comprise a connection mechanism for both physical and electrical coupling.

The module of the controller having an outer shell element, an internal electronics element and a plurality of connecting faces may be substantially cube shaped. The cube-shaped modules may comprise one or more rounded corners.

The input device may comprise one or more of a button, joystick, trigger, mini joystick, directional pad. The module of the controller having an outer shell element, an internal electronics element and a plurality of connecting faces may be a multi-faced module comprising six face surfaces, each face surface comprising a respective connecting face. The module of the controller may further comprise an internal power source.

DESCRIPTION OF THE DRAWINGS

FIG. 1A to 1C is a schematic representation of a modular controller of the present disclosure

FIG. 10A to 10D is a further representation of a number of modules and peripherals according to the present disclosure

DETAILED DESCRIPTION

Figure 2A:
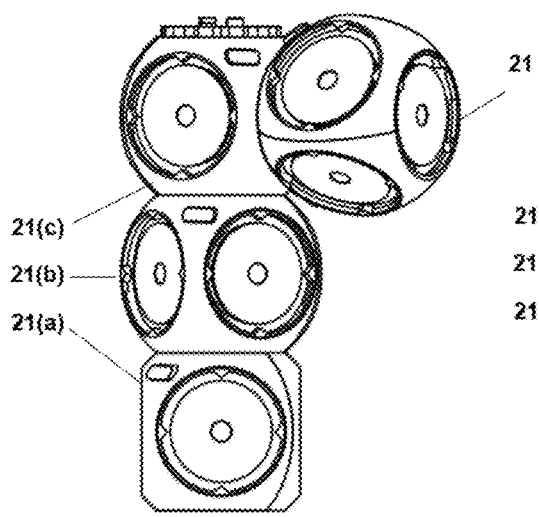
FIG. 2A to 2D is a representation of four connected modules according to the present disclosure
Figure 2B:
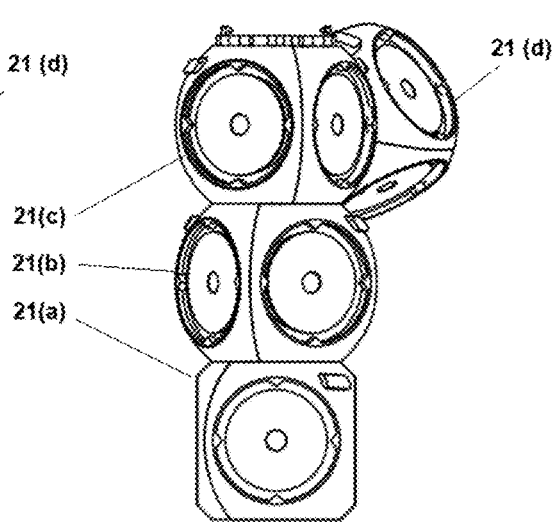
Figure 2C:
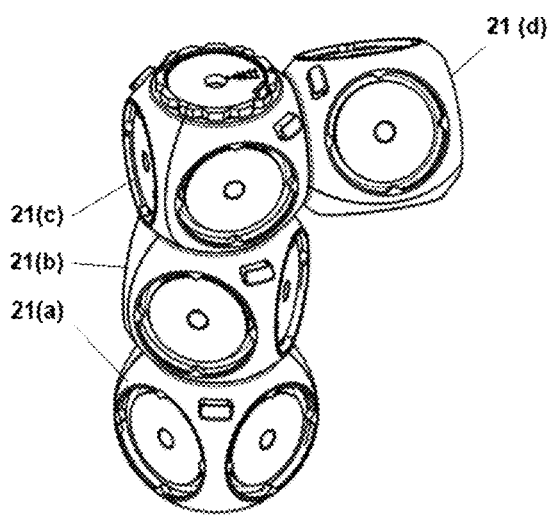
Figure 2D:
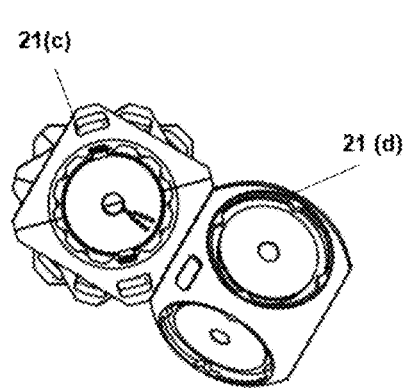

The invention will now be described with reference to the accompanying figures.

FIG. 1 is a schematic representation of a modular controller of the present disclosure. A modular controller for communication with an electronic device is shown. The controller comprises a first multi-faced module 11. FIG. 1A shows a side view of the module 11. FIG. 1B shows a top-down view of the module 11. FIG. 1C shows a perspective view of the module 11. The module comprises at least one connector 13 for releasable attachment to one or more additional modules 11.

When customising a modular controller the user connects modules 11 directly together without the requirement for wires or the additional support of an outer casing. In this manner, a great degree of configurability is provided to the user. The modular controller can take a number of shapes as defined by the design of the user. The modular controller is thus formed from either a single module (shown in FIG. 1) or by connecting a number of modules together. In FIG. 1, the controller comprises a first multi-faced module 11. The multi-faced controller shown comprises a solid shell 16 with six faces 12 in total. Three faces of the controller are seen in FIG. 1C. Furthermore, on each of the faces can be seen to comprise a connector 13. The connector may be taken to comprise the features inside the circular boundary on each of the module faces. The faces comprise a substantially flat area which comprises the connector 13. The connector may be a male type connector 14, which is slightly protruding from the module or a female type connector 15 which is slightly recessed into the module. A magnetic element 17 is shown central to the faces of the module. Buttons 18 to facilitate detachment or release of modules are shown. However, it should be noted that such buttons may not always form part of a module. Further features for the detachment and release of modules will be described later. In addition, the features of the connector, including the male and female type connectors will be described in more detail below. It will be appreciated that the module 11 of FIG. 1 has two planes of symmetry, or four planes of symmetry if the buttons 18 are disregarded as described above. Furthermore, it will be appreciated that higher numbers of planes of symmetry may be achieved in other embodiments for instance where other module shapes are envisaged and/or where connectors 13 are configured not as complimentary male/female pairs, but where each connector is of a uniform configuration that facilitates the interconnection of two such uniform connectors. The general action of connecting modules and examples of the configurations achievable by connection of modules will now be described.

As noted, the connectors provide for releasable attachment to one or more additional modules. FIG. 2 is a representation of four connected modules 21 according to the present disclosure. FIGS. 2 A, B and C show perspective views of the modules while FIG. 2 D shows a top down view of the modules. FIG. 2 shows a substantially "L" shaped configuration with a single module 21 (d) connected to the top right of a column or stack of three connected modules 21 (a), (b), (c). When connected in such a manner, the modules are electrically interconnected via the connectors. Furthermore, the connectors provide for physical integration of the modules such that it becomes, in effect, a single handheld device. Furthermore, the user is provided with a high degree of flexibility to connect modules according to their requirements. FIG. 3 shows a further example comprising six modules 31 in two columns or stacks of three. FIG. 3A shows a front view, FIG. 3B shows a side view, FIG. 3C shows a bottom-up view, while FIG. 3D shows a perspective view of the modules. However, the ultimate outcome is that single handheld device made of one or more modules is provided. Furthermore, in FIG. 3 a number of the modules are configured as joystick modules 32. This module will be described further in the section on "Peripherals". The device requires no external wires to either power the device or to achieve connection to an electronic device (such as games console) being controlled. However, the controller can be connected if required to a console or computer using a cable (for example, via a USB cable that connects to a USB C port on a module). This cable can be used either to issue commands directly to the console/computer and/or to supply power to and charge the rechargeable battery in the controller.

Again, it should be noted that the configurations of FIG. 2 and FIG. 3 are shown only as sample configurations that are possible upon connection of four and six modules respectively. It can be appreciated that a vast number of different configurations are possible based on the number of modules used and the configuration of the modules as determined by the user. It can be seen in both the configuration of FIG. 2 and FIG. 3 that many connectors remain visible and thus available for connection of further modules. Furthermore, not only can modules be connected together, but the individual modules may have one or more peripheral devices connected to them.

Figure 3A:
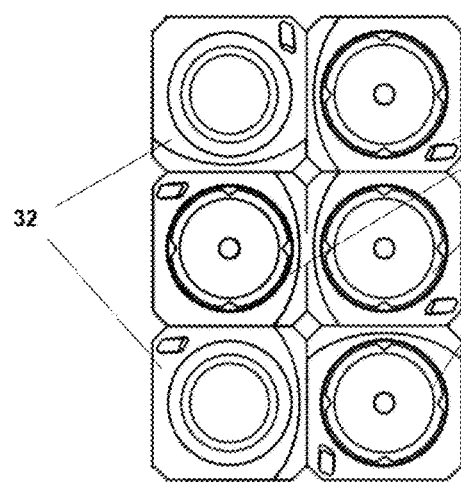
FIG. 3A to 3D is a representation of six connected modules according to the present disclosure
Figure 3B:
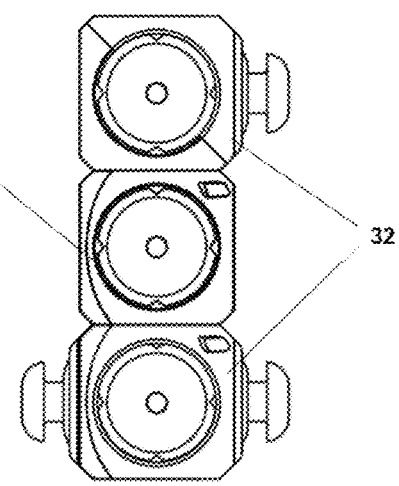
Figure 3C:
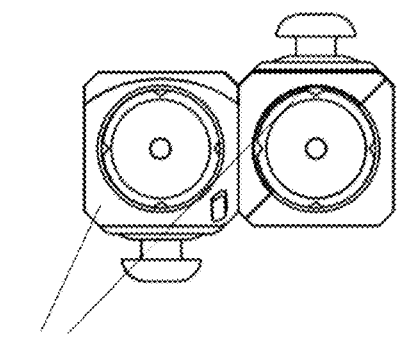
Figure 3D:
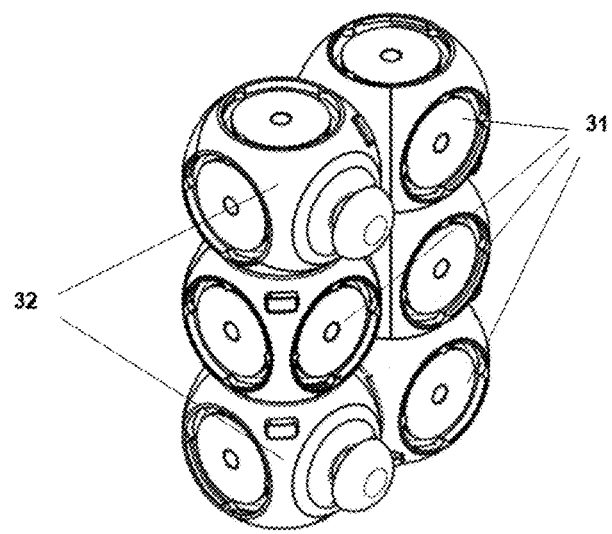

With further reference to FIG. 2A, it should be noted that module 21 (b) is rotated relative to module 21(a) such that equivalent faces 22 (b) and 22(a) on each module do not point in the same direction. Note also that module 21(c) is rotated relative to 21(b). Similarly, module 21(d) is rotated relative to 21(c). This rotational action will now be described.

Module Configuration and Rotation

FIGS. 1 to 3 show the first module and further modules according to the disclosure, with the modules being in a substantially cube-shaped configuration. The modules are substantially cube shaped in that they have six predominantly flat surfaces, as per a cube. The modules also comprise rounded corners and rounded surfaces between the sides, as per a sphere.

The modules are thus shaped such that they have characteristics of both a cube and a sphere. To understand the geometry of the module, it should be considered that the shape of the module can be taken to begin as a full sphere in an X-Y-Z axis space. The final module shape is derived by removing two spherical caps in parallel planes from the opposing sides of the sphere in each of the X, Y and Z directions. As such, six spherical caps are removed in all and a new shape remains comprising six flat surfaces which are either parallel or perpendicular to each other.

This module shape leads to a high number of unique possible configurations. If it is considered that each face is unique, then the number of configurations for N cubes is given by:

$$NConf = 6 \times 24(N-1)$$

NConf=Number of Configurations

N=Number of Cubes

The number of configurations for a basic modular kit comprising, for example, 4 cubes (N=4), is then given by:

$$NConf = 6 \times 24(4-1) = 82{,}944 \text{ configurations}$$

Of course it should be noted, the number of core modules available to the user is not limited to 4, and so this number of possible configurations can be increased greatly. A further advantage of the cube-sphere shape is that it smooths the corners of the core controller modules, increasing the potential for ergonomic configurations.

The 6 circular planes resulting from the module shape act as the faces of the new cube-sphere quantum. These circular faces are the connection points for additional module cube-spheres. As each face is circular, the cube-spheres may theoretically be connected at any angle. However, the Applicant found that due to manufacturing and design limitations this theoretical limit was most suitably set to 12 indexed rotational positions. This then leads to the following number of configurations with 4 cube-spheres:

NConf=$NA \times 6 \times 24(N-1)$

Figures 4A, 4B, 4C:
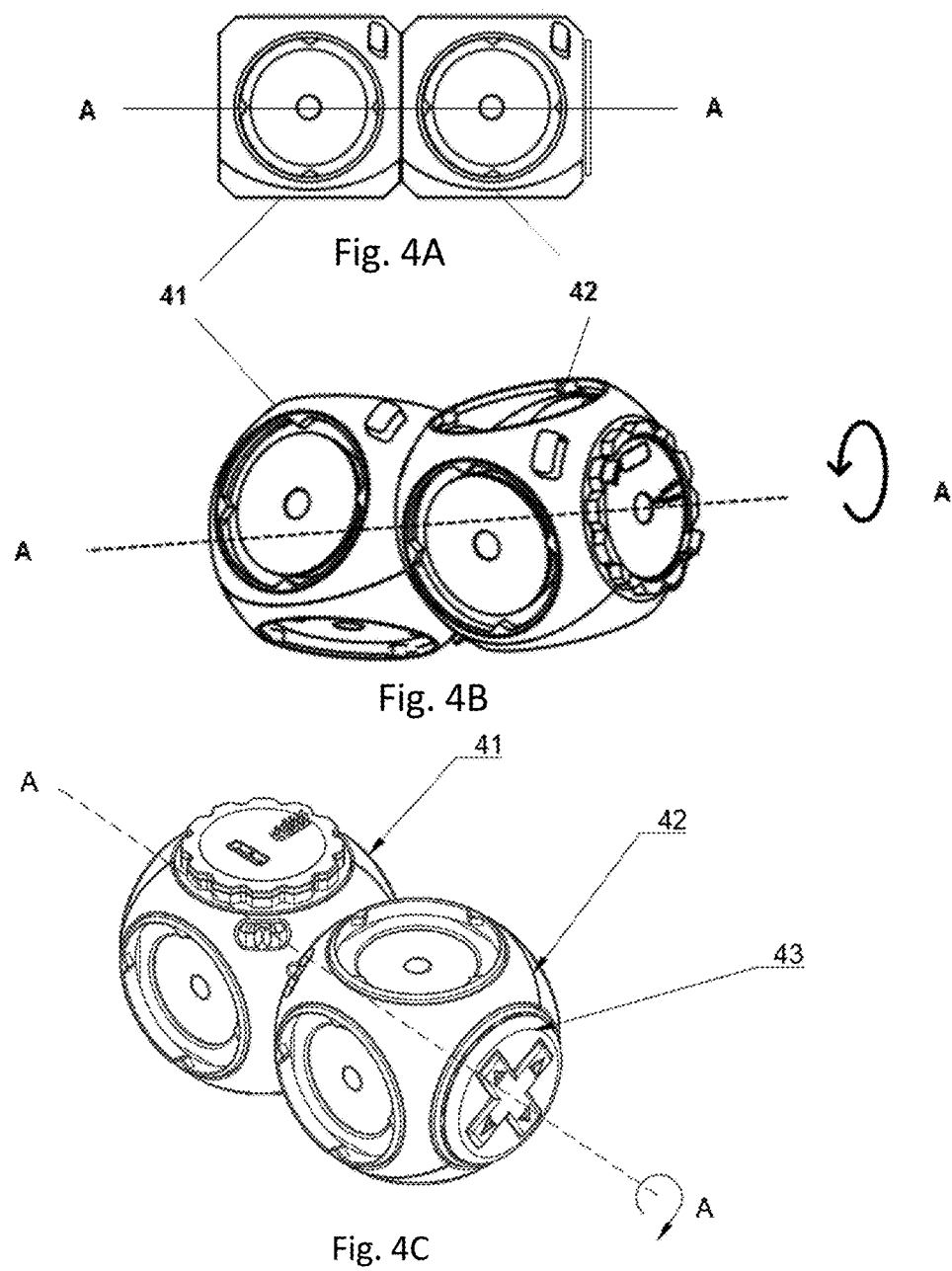
FIG. 4A is a representation of first connected module and a second connected module.
FIG. 4B is a representation of the second connected module rotated with respect to the first connected module.
FIG. 4C is a representation of the second connected module further connected to a peripheral device.

NConf=Number of Configurations $NA$=Number of Discrete Angles $N$=Number of Cubes NConf=$12 \times 6 \times 24(4-1)$=995,328 configurations A first module and a second module are thus connectable in a large number of configurations. The modules are connectable to one another about a common axis and in a plurality of rotational orientations relative to one another about said common axis. With reference to FIG. 4A, this axis is shown as a line 'A' passing through the centre of the first module 41 and the second module 42. FIG. 4B shows the same modules as FIG. 4A in a perspective view. However, it should be noted that the second module 42 has now been rotated relative to the first module about the axis 'A'. The connector provides that modules may be rotated and "set" in a number of fixed or indexed positions relative to one another. Furthermore, the modules may remain connected while the rotation takes place. Rotation in a clockwise and an anti-clockwise direction is possible, thus providing a great degree of maneuverability to the user. FIG. 4C shows the same modules as FIGS. 4A and 4B with a peripheral device 43 attached to the second module 42. As can be appreciated, the peripheral device 43 can be rotated relative to the second module 42 about the axis 'A', which is the central axis common to peripheral device 43 and second module 42.

Peripherals

Figure 5A:
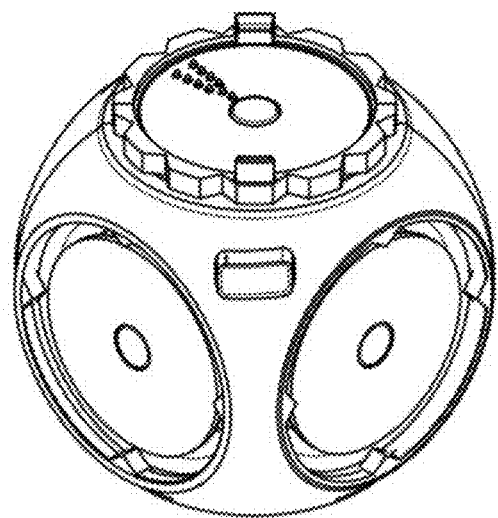
FIG. 5A to 5L is a representation of a number of module types and peripheral types suitable for connection for forming of the modular controller of the present disclosure

FIG. 5A to 5L is a representation of a number of module types and peripheral types suitable for connection for forming of the modular controller of the present disclosure. FIG. 5A shows a "Mother Cube" type module. The module has six connecting faces (3 are visible in the image). This module type may be considered to be a primary or main module. It comprises additional electronics and logic for mapping the connections of additional modules and the inputs of those module. In addition, the mother cube will house a power source for transferring power to any additional attached modules. The mother cube further houses logic and components for communicating with a console or computer under the command of the controller.

Figure 5B:
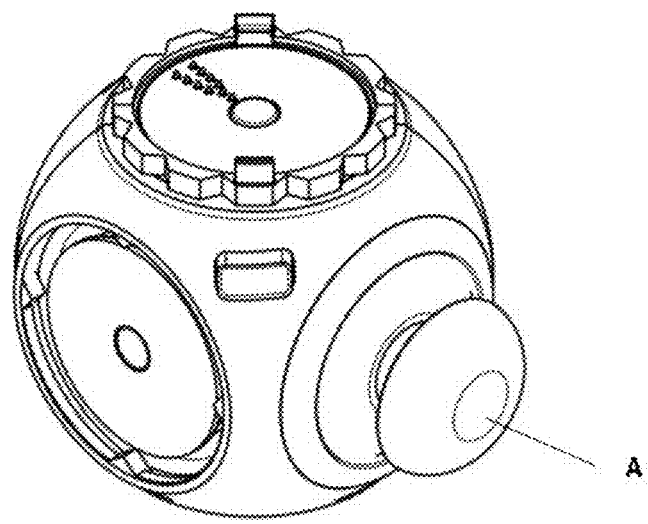

FIG. 5B shows a joystick module or analog control module. This is the same configuration as the module of FIG. 5A with the exception that a joystick 'A' input is integrated into one of the module faces. The joystick provides a range of directional motion inputs. The joystick provides great scope for fine rotational motion and granular directional control. As a joystick is a key input device for many applications, this module provides a "ready to go" integration of this key component. While the customizable integration of peripheral devices into a module presents many advantages, there may be occasions where such a "pre" integration of a component into a module is desirable. A joystick is one such example. As the joystick may be used quite vigorously and may be moved quite rapidly in a circular or oblique motion, for example during the playing of a game on a console, it is possible that such action may lead to the inadvertent detachment of a joystick peripheral. Providing a pre-integrated joystick overcomes this problem. It should be noted that this does not prevent further joysticks from being connected to this module as desired. Furthermore, joystick whether provided as a standalone peripheral or pre-integrated into a module may be further customizable by the user. For example, a user may be provided with a joystick fabricated specifically to their requirements. For example, a user may define the actual shape and dimensions of the stick. In addition, a user could stipulate stem length, cap diameter, degree of cap concavity/convexity. These may be available in a prefabricated variety of shapes and sizes or may be made to measure by a user.

Figure 5C:
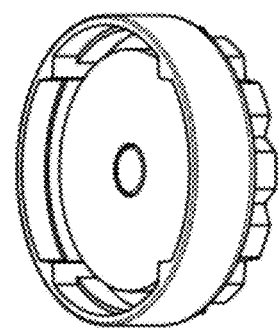
Figure 5D:
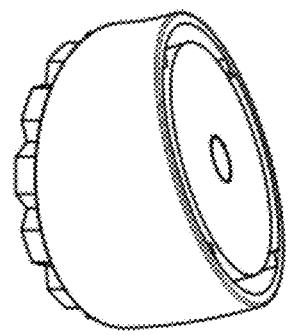

FIG. 5C shows a spacer module. This may be connected between modules to provide additional comfort and usability to a user. It is connected between two modules and forms a connection between the modules. However, it further provides for an additional spacing between the modules which would not be present where the modules are connected directly together. The spacer module may also be substantially wedge shaped (FIG. 5D) such that connected modules may be offset at an angle to each other.

Figure 5E:
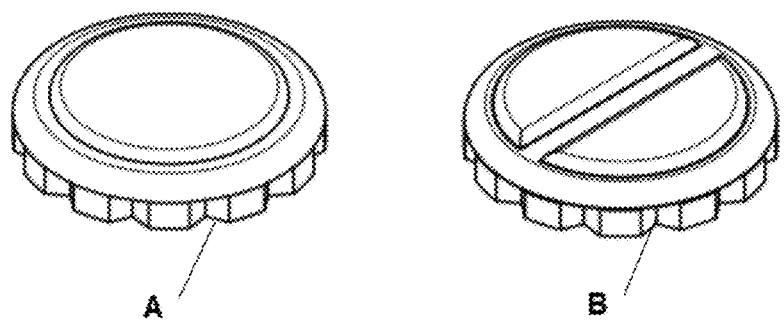

FIG. 5E shows a button peripheral device. A single button 'A' and dual button 'B' configuration are shown. The buttons provides a means for the user to provide input to the controller to be received by the device under control, for example a games console.

Figure 5F:
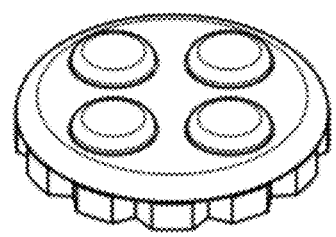
Figure 5G:
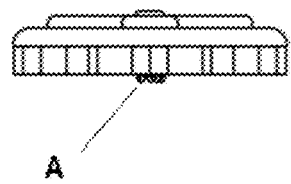
Figure 5H:
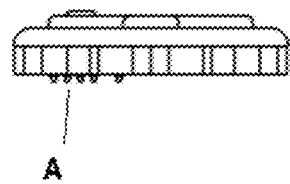
Figure 5I:
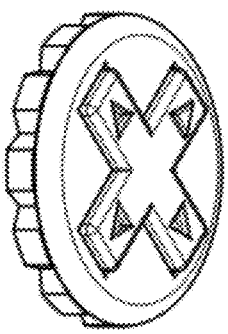
Figure 5J:
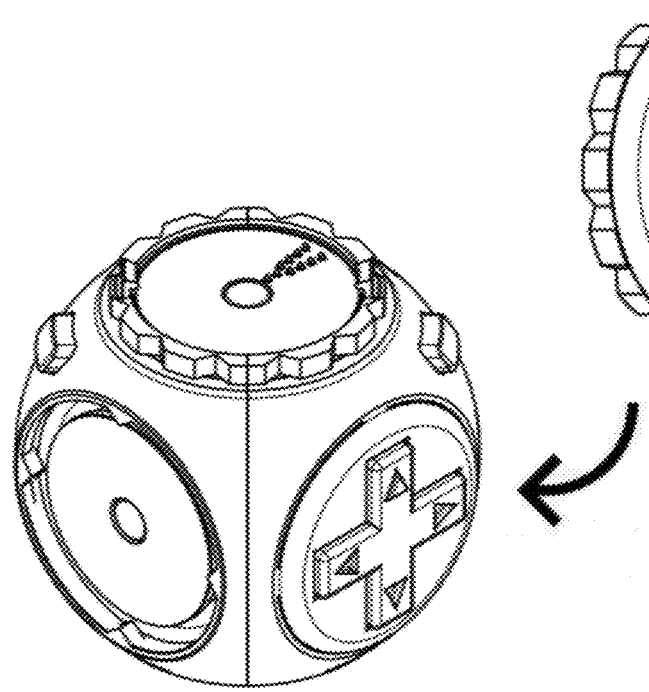

FIG. 5F shows a multi-button peripheral device. The buttons again provide a means for the user to provide input to the controller to be received by the device under control, for example a games console. Four buttons are shown in the example of FIG. 5F, however different arrangements and positions of buttons are possible.

FIGS. 5G, 5H, 5I and 5J shows a directional pad or "D-pad" peripheral device. This allows a user to provide directional input to the controller, for example to move a character or object directionally around a screen. As can be seen in FIGS. 5A to 5J, peripheral devices (in this case exemplified by the D-pad peripheral device) have a connecting face "A" configured to be connected to a corresponding face of a multi-faced module (in this figure, a six-faced module). It will be appreciated by the skilled person that at least some of the individual connecting faces of the multi-faced module may be connectable to any one of other multi-faced modules, peripheral devices, or other modules. In other words, at least some of the connecting faces of the multi-faced module can interchangeably connect to a variety of different attachments (such as for example multi-faced modules, peripheral devices or other modules). It will be appreciated by the skilled person that this characteristic is inherent to many embodiments of the invention and not just the one depicted in FIG. 5. It is one of the aspects of the present invention that enables such a high permutation of possible controller configurations.

Figure 5K:
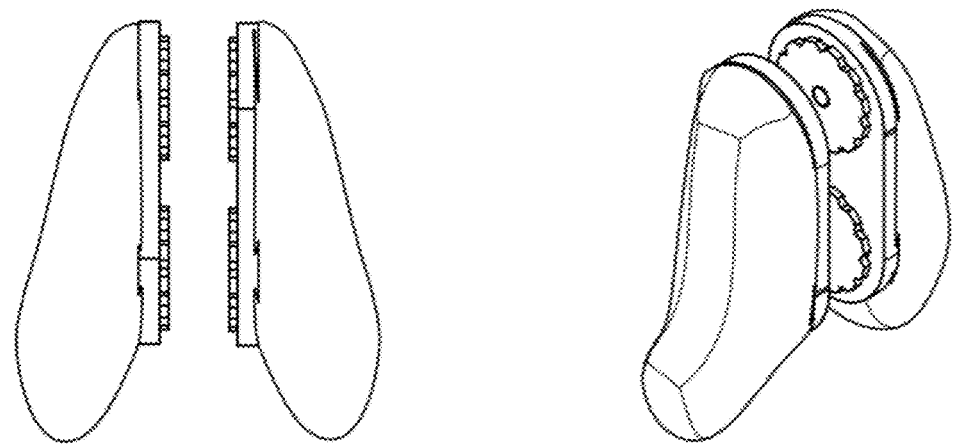

Some further peripherals may not provide for an input to the controller per se, but instead aid with customising the shape, appearance and usability of the controller. For example, FIG. 5K shows a pair of handle modules. These may be connected to provide a means of holding a controller with a greater level of comfort for the user. For example, the two handle modules may be connected on either side of a user constructed device to provide means to hold the constructed device in the hands with comfort. This is particularly advantageous because handles with different form factors may be customised and produced—for example via 3D printing to suit individual users' needs.

Figure 5L:
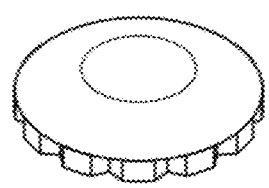

FIG. 5L shows a plug module. This is suitable for covering unused connectors on modules to protect the connector, for example from dust or moisture ingress. As such, when a module is detached, or when a connector is not in use, the connection of the modular controller may be sealed.

In addition (but not shown in FIG. 5) a trigger type module may be provided. This again provides a means of input like the button modules. The trigger provides a shape that is configured to receive multiple consecutive inputs at high speed. This is suitable for example, where "rapid fire" input to a device is desired. In addition (but again not shown in FIG. 5), another type of peripheral provides anchor/attach point for a strap or lanyard. This is advantageous particularly for users who may have limited ability to grip the device while inputting commands. As such, the ability to secure the device to a hand or hands would be useful. Accordingly, providing one or more anchor points for a lanyard or strap would be helpful. The anchor points could be on the same anchor module or different anchor modules located on different faces of the controller. A strap could be fastened by releasable attachment to at least one anchor. Alternatively, a strap could be permanently or semi-permanently attached to anchor modules at each end, the length of the strap being adjustable by way of an adjustment mechanism, e.g. buckle or ratchet.

A modular controller thus provides a handheld control device made up of any combination or the modules or peripheral devices described.

Module Connectors

Figure 6:
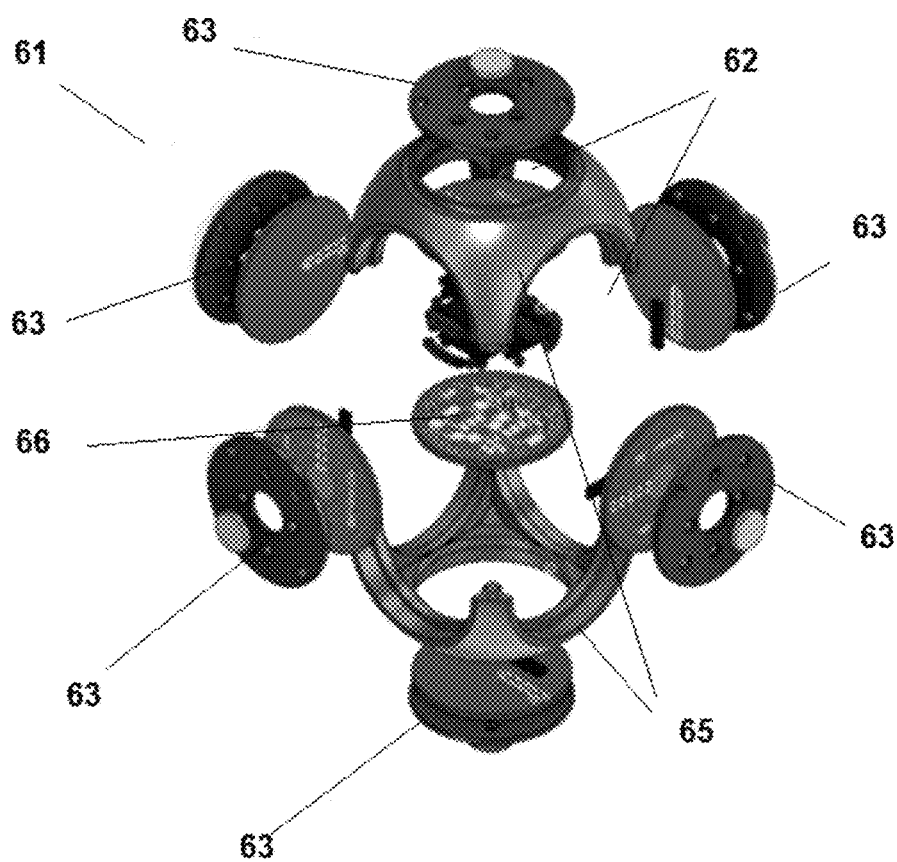
FIG. 6 is an exploded view of a module according to the present disclosure

FIG. 6 is an exploded view of a module 61 according to the present disclosure. The main components of the module will be briefly described here while further description of a number of the component parts, including the connectors will follow. The module 61 comprises a solid shell 65 which is substantially cube-shaped as previously described. Openings are provided on the faces 62 of the shell 65 to house the connectors 63. Central to the module is an electronic element in the form of a printed circuit board, PCB, 66 or a motherboard which both controls the modular device and further comprises logic to ensure that the functions of the module itself and its connectivity to additional devices are communicated to the electronic device under the command of the controller. The module further comprises a power source to power both the module itself and to distribute power to connected modules. A number of power sources may be provided. The module may be provided with a slot for an external battery. Such a battery may be extracted for recharging via a mains power connection. Alternatively, the extracted battery may be discarded and replaced. Alternatively, a rechargeable battery may be integrated into the module. As such, the battery may remain within the module and the module may be provided with a USB C port, or a similar port for recharging of the battery. In such a configuration, the controller may be hardwired for power if required, i.e. and be used while being continuously charged by a wired connection. Or alternatively, the controller may be used wirelessly having being pre-charged. The module comprises six surfaces 62 which are configured with connectors for connecting either an additional module or a peripheral device. The connectors are either male type connectors or female type connectors. The connectors are now further described.

The connection mechanism as described allows the user to connect modules together. The development of this mechanism is a result of managing constraints from user requirements, accessibility requirements, testing requirements, assembly requirements, injection molding requirements, 3D printing requirements, electronic engineering requirements and EU and North American regulatory requirements. The design of the connection mechanism is such that it requires the minimum space possible, is easy to detach and is accessible to users.

Figure 7:
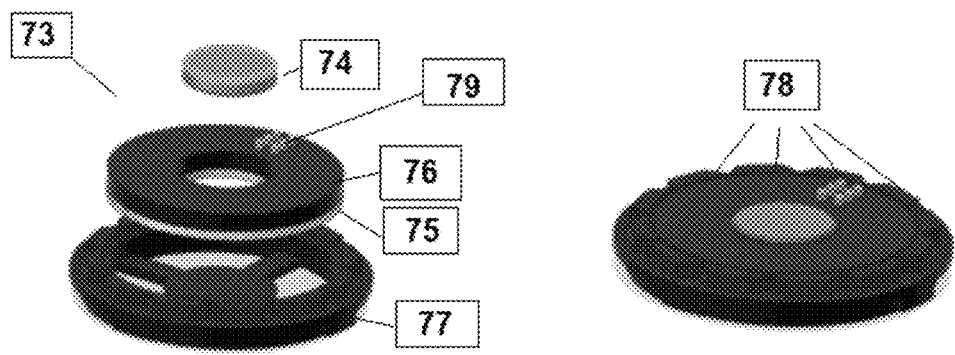
FIG. 7 is an exploded view of a male connector according to the present disclosure
Figure 8:
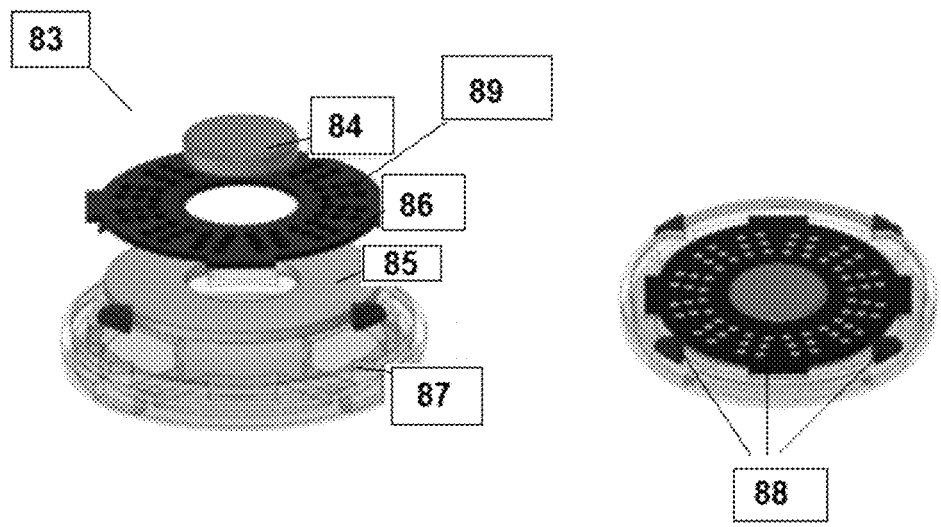
FIG. 8 is an exploded view of a female connector according to the present disclosure
Figure 9A:
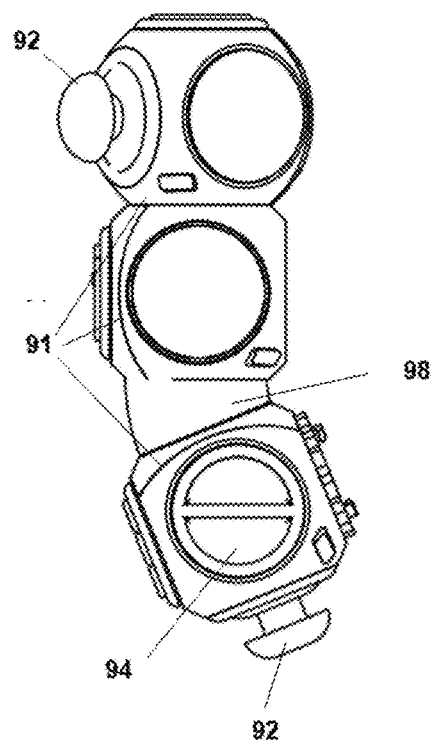
FIG. 9A to 9D is a representation of a number of modules and peripherals according to the present disclosure
Figure 9B:
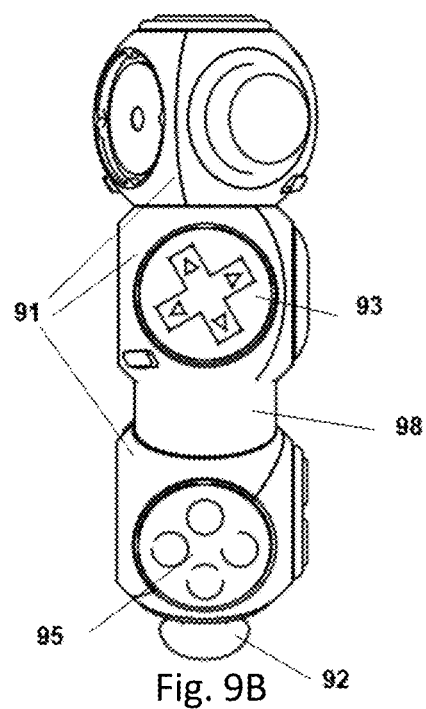
Figure 9C:
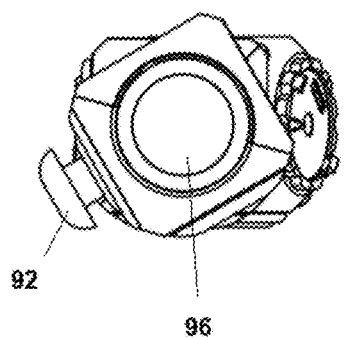
Figure 9D:
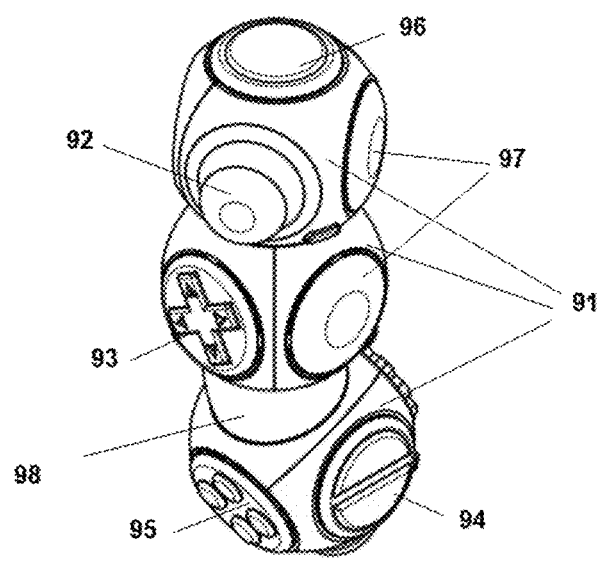
Figure 11B:
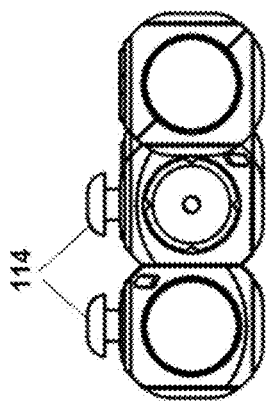
FIG. 11A to 11D is a further representation of a number of modules and peripherals according to the present disclosure in an example connected configuration
Figure 11D:
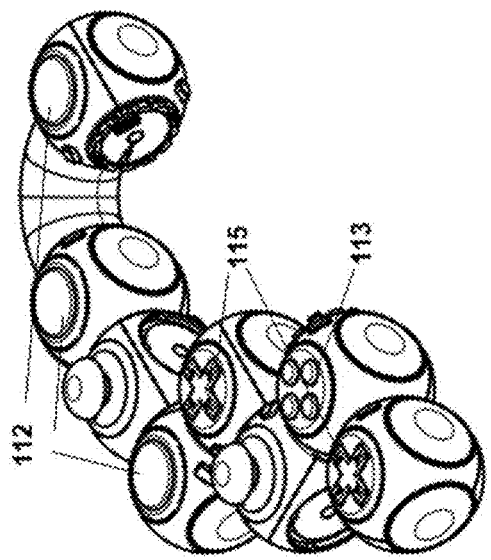
Figure 11A:
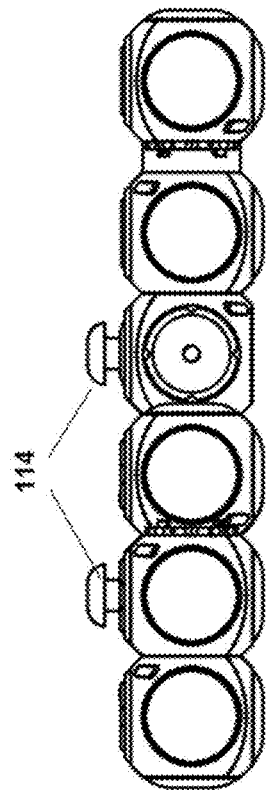
Figure 11C:
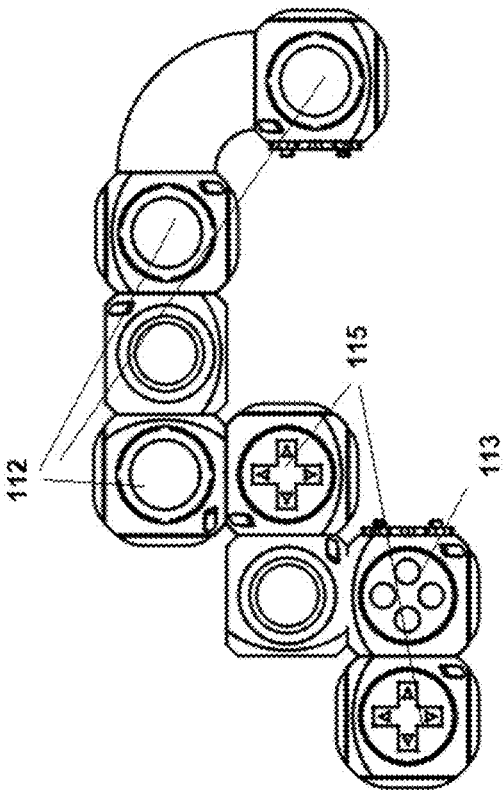

The male connector 73 is described with reference to FIG. 7, while the female connector 83 is described with reference to FIG. 8. The male connector 73 comprises a magnet 74, a PCB 75, a PCB cover 76 and a connection element 77 for connection to the face of the module. An exploded view is shown to the left while the completed connector is shown to the right. A gear 78 is shown about the outer circumference of the connection for engagement with alignment teeth 88 of a female connector 83. The PCB cover 76 comprises a series of pogo pins 79 which serve to conduct electricity through the connection.

The female connector 83 also comprises a magnet 84, a PCB 85, a PCB cover 86 and a connection element 87 for connection to the face of the module. An exploded view is shown to the left while the completed connector is shown to the right. Alignment teeth 88 are shown about the outer circumference of the connector for engagement with the gears 78 of the male connector 73. The PCB cover 86 comprises a series of recesses 89 or receiving holes which serve to guide the pogo pins 79 of the male connector through to a series of contacts to conduct electricity through the connector. The recesses may comprise female copper pads, allowing for continuous electronic signal transmission during the period of connection. The female connector may further comprise s a programmable LED translucent ring (not shown) to provide user feedback and aesthetic customization.

The pogo pins 79 of the male connector in the example shown, form a matrix configuration which connect into the series of receiving holes or recesses 89 in the female connector. A configuration of six pins is shown however alternative configurations are possible. For example, a substantially V-shaped configuration comprising two lines of pins may be utilised. (Such a configuration is visible in the male connector of FIG. 1). Furthermore, with reference to the female connector as shown in FIG. 8, it can be seen that the series of receiving holes or recesses 89 on the female connector extends annularly around the female connector. As such, when the male connector meets the female connector, the pogo pins of the male connector extend into a corresponding matrix shaped "set" in the series of receiving holes or chambers in the female connector. Rotating the modules after connection thus has the effect that the pogo pins may retract and subsequently extend into the next "set" in the series of receiving holes or chambers in the female connector. In this manner, a plurality of indexed configurations is provided, whereby the modules may be connected and then rotated thorough the plurality of configurations, with the controller clicking into place from an initial configuration into each subsequent configuration. Each of these configurations results from rotating a module through one of the NA discrete angles as described above.

The magnet 74, 84 serves to provide a strong initial connection between modules. The magnet may be provided using neodymium magnets. This magnetic bond may be bolstered by a fiction fit between the gears of the male connector and the alignment teeth of the female connector. In some embodiments the modules can thus accommodate both mechanical and magnetic connector elements, and this allows some connections to rely on both means while other connections could rely exclusively on one or the other, i.e. some modules may be mechanically connected only and other modules may be magnetically connected only.

EXAMPLE CONTROLLER CONFIGURATIONS

Accordingly, modules have been described which allow for the connection of additional modules and multiple peripheral types. Furthermore, the connector types which provide for connections and the rotational action of connected modules has been described.

Thus, it should be understood that the modules and connectors as described provide for the connection of multiple modules and multiple peripherals to form a large variety of hand held modular controllers suitable to the requirements of a given user. FIGS. 9 to 11 show a number of possible examples of configurations using the modules and peripheral elements as previously described. FIG. 9A to 9D is a first example representation of a number of modules and peripherals according to the present disclosure. FIG. 9 shows three modules 91 each comprising a number of peripheral devices. A joystick 92, D-pad 93, 2 button input 94, 4 button input 95, single input button 96 and a number of plug modules 97 are shown. The rotational action of the modules relative to each other is also visible. Furthermore a wedge shaped spacer 98 is shown between two modules. FIG. 10A to 10D is a second example representation of a number of modules 101 and peripherals according to the present disclosure. FIG. 10 shows four modules 101 each comprising a number of peripheral devices. In this example, a number of plug modules 102 are shown along with a D-pad 103 and a four button input 104. Two handle modules 106 are placed, one each side of the overall device. FIG. 11A to 11D is a third example representation of a number of modules and peripherals according to the present disclosure in an example connected configuration. This is a "snake" like configuration showing an arrangement of eight modules. Again, each module is connected to a number of peripheral devices Single button 112, multi-button 113, joystick 114 and D-pad inputs 115 are shown.

It should be clear from the examples of FIGS. 9 to 11 that a variety of configurations are achievable due to the configurability of the both the modules and the peripheral devices. A wide range of conventional or traditional controller shapes as well as non-conventional controller shapes may be constructed according to the user's requirements.

All that is required for a given shape and configuration of controller to function is that one of the modules in a given controller is provided as a "Mother Cube". As previously noted, the Mother Cube is responsible for mapping the configuration of the entire controller in order to correctly route signals. It identifies the module that has been connected as well as the angle of connection by using a unique series of resistors for each module-angle pair. Furthermore, the Mother Cube is responsible for powering the device. A lithium ion battery, for example, 560 mA and electronic motherboard (which controls the battery, compiles inputs and communicates via wireless connection may be housed within the Mother Cube. The wireless connection may be a Bluetooth connection, for example a Bluetooth Low Energy (BLE) connection may be provided. Other wireless connections such as Wi-Fi, New Radio (NR), Long Term Evolution (LTE), Evolved Packet System (EPS) may be utilised.

Release Mechanism for Disconnecting Modules

Figure 12A:
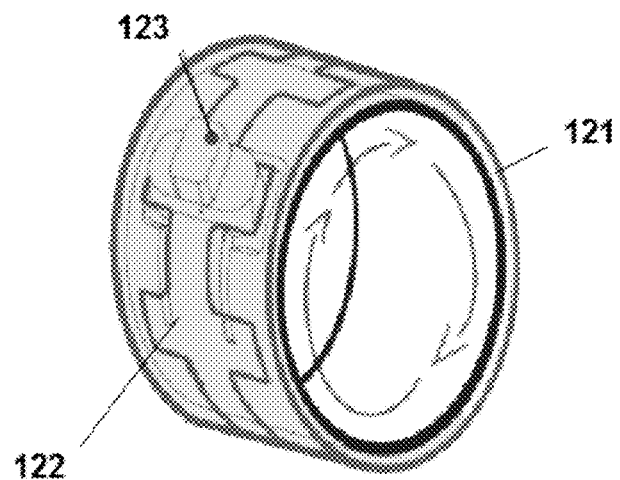
FIG. 12A to 12C is a representation of a first release mechanism of the modular controller of the present disclosure FIG. 13A to 13C (a) to (c) is a representation of a second release mechanism of the modular controller of the present disclosure
Figure 12B:
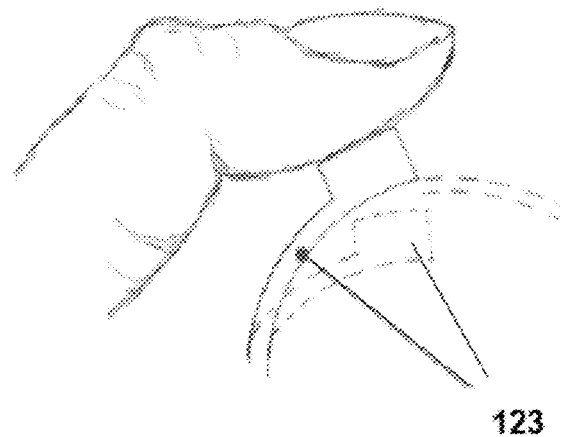
Figure 12C:
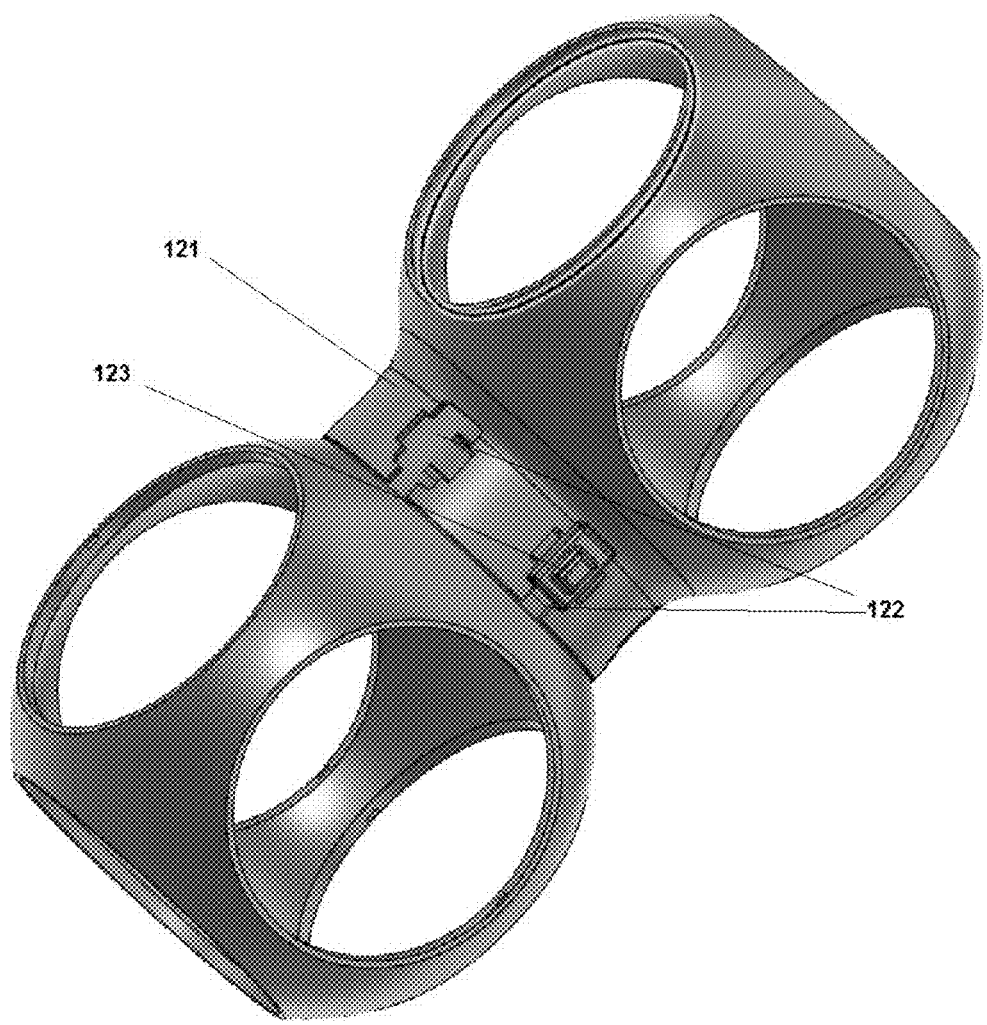

As noted previously, modules of the modular controller are configured to be releasably attachable so that while a connection remains strong while it is in place, it must also be easily detachable by a user for reconfiguration as desired. Accordingly, a release mechanism is provided. The release mechanism provides for a reliable and rapid manner to detach a module from a connected module. A first embodiment of the release mechanism is shown in FIGS. 12A, 12B and 12C.

In this embodiment, a user presses directly onto a flange 121 between the two modules in order for them to be separated. The release mechanism comprises a circular biased flange piece 121 which extends around an extended connection between two modules. The flange comprises a number of slots 122 which allow connected modules to be rotated into different relative positions as previously described but allowing the modules to remain connected. An extruded button 123 on the flange allows for rotation to occur when the button is partially pressed or fully separating the modules when fully pressed.

Figure 13A:
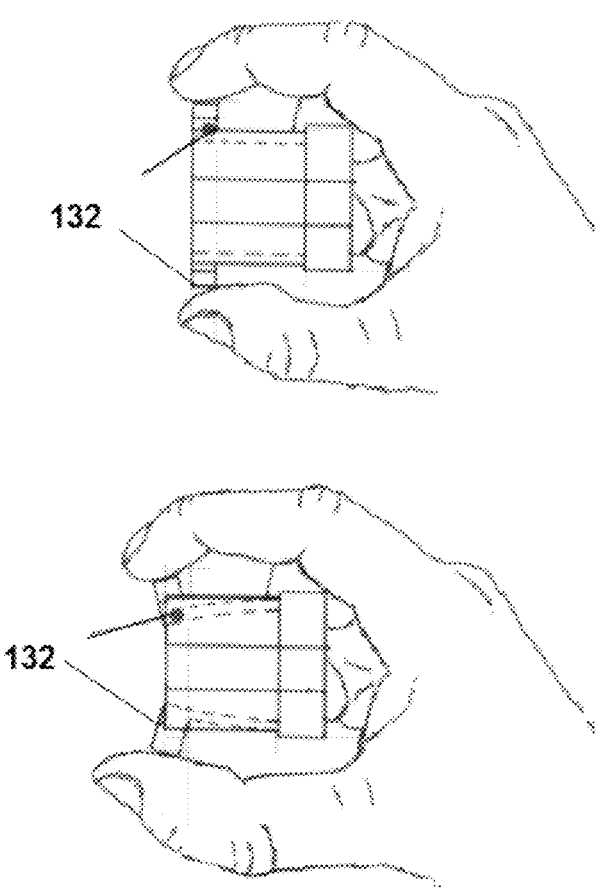
Figures 13B, 13C:
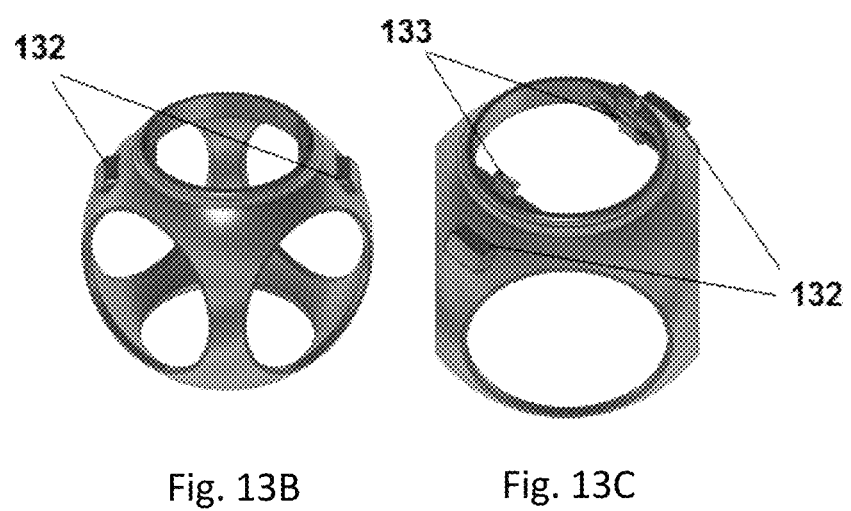

A second embodiment of the release mechanism comprises a biased release mechanism as shown in FIGS. 13A, 13B and 13C. The biased release mechanism comprises a spring loaded latch mechanism. This provides that modules may be reliably "popped" apart upon being disconnected. Applying pressure to two buttons 132 on either side of a module casing releases the latch 133 and allows the modules to be separated. Having a plurality of biased components that must be pressed simultaneously to disconnect modules in this manner reduces the chance of accidental disconnection while in use.

The Controller in Operation

Additional aspects of the design and functionality of the controller of the present disclosure as well as aspects of the controller in operation are now discussed.

The controller of the disclosure starts as a kit. A user can begin with a Mother Cube the Mother Cube being a substantially cube-shaped module as previously described. The module shell has six faces and may be made of plastic, for example a polylactic (PLA) plastic that houses the internal electronics element. There are five female faces for connecting external peripherals and one male face for connecting additional modules.

This Mother Cube is the foundation of the controller and is the first step for all other modules which the user wants to add in different directions, rotations, and angles. The modules are complemented by spacers, which allow for fine tuning of geometric positioning with respect to both distance and angle. The spacers may be ring shaped such that two connected modules share an axis running through the centre of the modules or the spacers may be wedge shaped such that axes running through the centre of each connected modules are offset at an angle from each other. Once all the modules are added in the configuration the user wants, peripheral modules such as press buttons, analogue sticks, and trigger buttons can be added to these faces. When the user is satisfied with their design, they can turn on the device from the Mother Cube which will begin a configuration process to allow it to understand the layout of the connected peripherals and modules. When this configuration is concluded, wireless connectivity, such as Bluetooth, is enabled and the controller attempts to connect to an electronic device, such as a console, of the user's choice. As the device is connected, it transmits any user inputs from the controller to access games and play. The device can be turned off again using a power button. As it is a battery powered device, users can charge their controller, for example, over USB C with a standard 5V mains.

The controller comprises internal logic for keeping track of what orientation the system is in at any given time. This is done through a mapping algorithm which identifies module-angle pairs using a unique series of resistor values. This mapping also keeps the controller in sync with additional digital services, such as a phone app which can remap the controller via a wireless connection such as Bluetooth, and a web-based Controller Builder. A user can view their controller in the Controller Builder, and edit it with modules they may not physically own yet, or even build a new controller from scratch online. The Builder further provides that users can use sliders to customize the precise geometry of certain modules such as the handle grips or the analog sticks.

Controller Building

An example starter kit supplied to a user to create a modular controller as described may comprise the following components: 2× Mother Cubes; 2× analog modules; 1×D-Pad peripheral; 2×1-button peripherals; 2×2-button peripherals; 2×4-button peripherals; 9× plug peripherals; 2× handles; 2× straight spacers; 2× angled spacers; Box with Tray; Instruction Manual; USBC Cable and a Tool to detach peripherals.

As described herein, using the above components a high degree of design freedom is provided to the user to produce a modular controller that meets their specific needs.

The words "comprises/comprising" and the words "having/including" when used herein with reference to the present invention are used to specify the presence of stated features, integers, steps or components but do not preclude the presence or addition of one or more other features, integers, steps, components or groups thereof.

It is appreciated that certain features of the invention, which are, for clarity, described in the context of separate embodiments, may also be provided in combination in a single embodiment. Conversely, various features of the invention which are, for brevity, described in the context of a single embodiment, may also be provided separately or in any suitable sub-combination.

The invention claimed is:

1. A handheld modular electronic controller comprising:
a first module having a first module face and first module internal electronic components, the first module face having a first module central axis running through a center of the first module face; and
a second module having a second module face and second module internal electronic components, the second module face having a second module central axis running through a center of the second module face, wherein the first module and the second module are configured to electrically couple the first module internal electronic components with the second module internal electronic components and physically couple each other by connection of the first module face to the second module face such that the first module central axis and the second module central axis are coaxially aligned along a common axis, the first module face and the second module face being fixable in more than four rotational orientations relative to one another about the common axis.

2. The handheld modular electronic controller of claim 1, wherein the first module and the second module comprise complementary magnets respectively, the complementary magnets configured to physically couple the first module face and the second module face.

3. The handheld modular electronic controller of claim 1, wherein the first module face and the second module face comprise a plurality of indexing features, the plurality of indexing features configured to orient the first module face with the second module face with each other.

4. The handheld modular electronic controller of claim 1, wherein at least one of the first module internal electronic components and the second module internal electronic components comprise electronic components configured to automatically detect the rotational orientations relative to one another about the common axis.

5. The handheld modular electronic controller of claim 1, wherein the first module and the second module comprise the first module and the second module having the same shape.

6. The handheld modular electronic controller of claim 5, wherein the first module and the second module comprise the first module and the second module having a cube shape.

7. The handheld modular electronic controller of claim 6, wherein the cube shape includes one or more rounded convex corners.

8. The handheld modular electronic controller of claim 1, wherein the first module and the second module comprise the first module and the second module having different shapes.

9. The handheld modular electronic controller of claim 1, wherein the first module and the second module comprise at least one of the first module and the second module having an input device.

10. The handheld modular electronic controller of claim 9, wherein the input device comprises at least one of a button, a joystick, a trigger, a mini joystick, or a directional touch pad.

11. The handheld modular electronic controller of claim 1, wherein the first module and the second module comprise the first module and the second module each having 6 faces.

12. The handheld modular electronic controller of claim 1, wherein the first module and the second module comprise at least one of the first module and the second module having a power supply.

13. The handheld modular electronic controller of claim 12, wherein the power supply comprises the power supply configured to provide power to one or more coupled modules.

* * * * *